United States Patent [19]

Kamlukin et al.

[11] Patent Number: 4,807,904
[45] Date of Patent: Feb. 28, 1989

[54] RIDING MOWER CHASSIS HAVING IMPROVED REAR PORTION

[75] Inventors: Igor Kamlukin, Mequon; Donald G. Penkoske, West Bend; John W. Schanz, Mequon, all of Wis.

[73] Assignee: Simplicity Manufacturing, Inc., Port Washington, Wis.

[21] Appl. No.: 47,931

[22] Filed: May 7, 1987

[51] Int. Cl.[4] .............................................. B62D 21/00
[52] U.S. Cl. .................................... 280/781; 180/311; 298/38; 298/17 T; 56/DIG. 22
[58] Field of Search ............... 180/312, 311; 280/781; 56/DIG. 11, DIG. 22; 298/1 C, 38, 17 R, 17 T, 2

[56] References Cited

U.S. PATENT DOCUMENTS

| | | | |
|---|---|---|---|
| 2,963,248 | 12/1980 | Anderson | 298/38 |
| 3,002,782 | 10/1961 | Jahn | 280/781 |
| 3,309,759 | 3/1967 | Vittone | 280/781 |
| 3,311,186 | 3/1967 | Kamlukin | 180/53.1 |
| 4,325,211 | 4/1982 | Witt et al. | 56/DIG. 22 |
| 4,341,059 | 7/1982 | Gerzanich | 56/DIG. 22 |
| 4,417,765 | 11/1983 | Wirsbinski | 298/38 |
| 4,429,515 | 2/1984 | Davis, Jr. et al. | 56/DIG. 22 |
| 4,596,347 | 6/1986 | Hite | 298/17 T |

Primary Examiner—Richard A. Bertsch
Attorney, Agent, or Firm—James E. Nilles; Thomas F. Kirby

[57] ABSTRACT

A riding mower chassis frame comprises a pair of identical beams extending along the chassis at its opposite sides. A one-piece channel-shaped member bridges the beams near the rear of the chassis to give the frame rigidity, provide for laterally swingable connection to the frame of a rear axle on which steerable wheels are mounted, and serve as a pan in which movable weights are carried. A platform mounted on the rear of the frame, for carrying interchangeable accessories, is swingable to and from a horizontal load carrying position about a transverse axis at the rear of the frame. An automatically engaging releasable latch on the platform cooperates with another frame member that bridges across the beams.

20 Claims, 4 Drawing Sheets

RIDING MOWER CHASSIS HAVING IMPROVED REAR PORTION

FIELD OF THE INVENTION

This invention relates to a riding mower chassis for a front mounted mower, said chassis having front traction wheels, steerable rear wheels, an engine mounted between the front and rear wheels, and an operator's seat supported over the engine. More particularly, the invention is concerned with improvements in the rear portion of such a chassis to provide it with a frame that is simple, inexpensive and sturdy and to adapt it for versatile cooperation with a variety of accessory loads.

BACKGROUND OF THE PRIOR ART

A riding mower chassis of the type to which this invention relates is mainly intended for carrying and powering a rotary lawn mower, although it may also tow a light trailer and carry certain unpowered equipment such as a clipping receptacle. Such a riding mower chassis is distinguished from a lawn tractor, which has a front mounted engine and which can carry interchangeable implements that are powered by its engine, such as a lawn mower, a snow blower or a tiller. For many applications the lesser versatility of the riding mower chassis is more than compensated for by its being more compact, lighter and substantially less expensive than a comparable lawn tractor. Nevertheless, it is obviously desirable for a riding mower chassis to be cooperable with a variety of useful accessories, especially if it can be given such capability without significant increase in its cost.

U.S. Pat. No. 2,924,928, to Rhoades et al, discloses a riding mower chasis of the general type to which this invention relates. However, on that chassis the mower was mounted between the front and rear wheels, and the front wheels were steerable while the rear wheels were power driven. The mower chassis of this invention, by contrast, is intended for a mower that is mounted in front of the front wheels, and its front wheels are driven while its rear wheels are steerable. A front mounted mower has the important advantage that it can operate under lowhanging bushes and the like, to trim areas that would be inaccessible to a mower mounted under the middle of the chassis. The driven front wheels and steerable rear wheels ensure good traction and a short turning radius, to provide maneuverability for satisfactory mowing in a confined space.

U.S. Pat. No. 4,384,443, to Hoogstrate, discloses a mowing machine chassis having front traction wheels and steerable rear wheels, wherein the front wheels were driven from an engine mounted over the rear wheels, behind the operator's seat. This arrangement was lacking in compactness because power inputs had to be transmitted along the full length of the chassis from the rear-mounted engine to the front traction wheels, while steering inputs had to be transmitted to the rear wheels from a steering wheel at the very front of the chassis. Furthermore, because of the rear-mounted engine, no useful cargo could be carried behind the operator's seat.

Unlike the machines of the two patents discussed above, the riding mower chassis of this invention, although of desirably short overall length, has a load supporting platform tiltably mounted behind its operator's seat, for supporting a dump body or any of various other accessories such as a clipping receptacle, a fertilizer spreader or a sprayer tank.

U.S. Pat. No. 4,429,515, to Davis, Jr. et al, discloses a mower chassis for a front mounted mower, having its engine mounted between the front wheels and the rear wheels and its operators's seat supported over the engine. Behind the engine was tiltable hopper for supporting a grass clipping receptacle or other cargo. The chassis had a tripod support on laterally spaced front propulsion wheels and a castered dual rear wheel. Steering was effected by individual control of the front wheels, each of which had its own independent hydraulic motor. This arrangement undoubtedly afforded extreme maneuverability, but it was also relatively expensive because of its need for a hydraulic system that included a pump as well as the two hydraulic wheel-driving motors and their controls.

With any riding mower having a pair of laterally spaced swivelingly steered wheels, whether such wheels are at its front or at its rear, it is essential for satisfactory traction and maneuverability that all four wheels be maintained in constant engagement with the ground notwithstanding irregularities in the terrain. To this end the steerable rear wheels of the chassis of this invention are mounted on an axle which is tiltable relative to the chassis frame about an axis parallel to the longitudinal centerline of the chassis. If the chassis is carrying no load other than the mower and the operator, it is often desirable to install weights over the rear wheels to maintain them in good steering engagement with the ground. Quick and easy installation and removal of such weights is obviously desirable, but it is also important that the weights, when installed, should be securely fastened to the frame, be as close as possible to ground level, and not to interfere with tilting of the load supporting platform or with any load that may be carried on it.

It will be apparent that the above mentioned requirements and desiderata should be obtained in a mower chassis that has a frame which is extremely sturdy and rigid but is nevertheless simple, inexpensive, and as light as possible.

SUMMARY OF THE INVENTION

With the above discussed considerations in mind, it is a general object of this invention to provide a frame for a riding mower chassis of the character described, comprising a relatively small number of simple and easily fabricated parts that are securely connected by means of a few easily made weldments.

Another object of the invention is to provide a riding mower chassis that has on its rear a versatile tiltable load supporting platform, said platform being adapted to support a small dump body or any of various other readily interchangeable accesories and being so mounted on the chassis that it tends to maintain a horizontal load supporting attitude in which it is, for safety, secured by means of a simple readily releasable latch that is automatically engaged as the platform is brought to that attitude.

A further object of the invention is to provide a riding mower chassis on which weights can be readily removably installed in a position over the steerable rear wheels where they will be effective to increase steering traction and at a low level where they will contribute to the stability of the machine and will be out of the way of the above mentioned tiltable load supporting platform and any load thereon.

A more specific object of the invention is to provide, in a riding mower chassis of the character described, a frame having a rear portion wherein there is a transverse member which is preferably formed in one piece and which affords great strength and rigidity to the frame, provides for tiltable connection of the rear axle to the frame and provides for simple but secure attachment of weights to the frame in a position directly over the rear axle.

It is also a specific object of the invention to provide a riding mower chassis with a frame having a rear portion wherein a laterally extending angle iron bridges across longitudinal beams to connect them and provide rigidity to the frame, provides support for a tiltable platform when the platform is in a horizontal load supporting position, cooperates with a latch on the platform to releasably lock it in that position, and provides a cam surface which cooperates with the latch as the platform is swung down to that position, to cause such locking to take place automatically.

These and other objects of the invention that will appear as the decription proceeds are achieved in the riding mower chassis of this invention, which comprises a frame that is elongated in a fore-and-aft direction and has a front portion to which laterally opposite propulsion wheels are connected, a rear portion to which laterally opposite steerable wheels are connected, and a medial portion on which an engine is mounted and on which a seat is supported over the engine. The riding mower chassis of this invention is characterized by the rear portion of its frame comprising a pair of laterally spaced apart beam elements extending rearward from the medial portion of the frame and having top surfaces contained in a common horizontal plane, and a bridging member extending laterally between those beam elements and secured to them near their rear ends. The bridging member has a substantially flat and horizontal web portion which is spaced below said plane, and has a pair of flange portions, each of which is elongated transversely to said beam elements and extends from one to the other of them, said flange portions being spaced apart in said fore-and-aft direction and projecting upward from said web portion to cooperate with it and with the beam elements in defining a pan. A pair of lugs on said bridging member project downward from it to a level beneath its web portion, said lugs being disposed between the beam elements and being spaced apart in said fore-and-aft direction. The chassis further comprises an elongated axle member having a pair of opposite end portions, to each of which one of the steerable wheels has a connection that provides for rotation and for swiveling of the wheel; and the chassis has pivot means providing a connection between said pair of lugs and the axle member whereby the latter is confined to swinging relative to the frame about an axis which is intermediate said end portions of the axle member, extends substantially in said fore-and-aft direction and is substantially equidistant from said beam elements.

Preferably, the transverse member is of substantially U-shaped cross-section and has its flange portions formed in one piece with its web portion and bent upward therefrom, and the lugs are also formed in one piece with the transverse member, being struck out of its web portion and bent downward from it.

The web portion of the transverse member can support at least one removable weight that is confined by the flange portions of that member against movement in said fore-and-aft directions. At least one of the flange portions has at least one hole therein through which a fastener can extend to be received in a weight, for securing the weight against displacement upwardly and in transverse directions relative to the frame.

Other preferred features of the invention are described below.

BRIEF DESRIPTION OF DRAWINGS

In the accompanying drawings, which illustrate what is now regarded as a preferred embodiment of the invention:

DETAILED DESCRIPTION OF PREFERRED EMBODIMENT OF THE INVENTION

Figure 1:
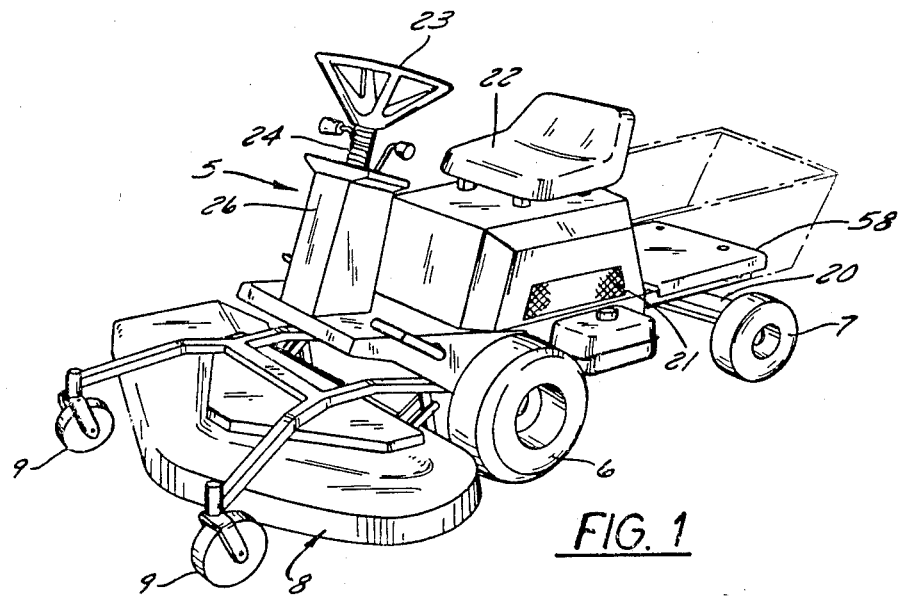
FIG. 1 is a perspective view of a riding mower chassis which embodies the principles of the invention and on the front of which a mower is mounted.

A riding mower chassis 5 of the type to which this invention relates has laterally opposite front propulsion wheels 6 and laterally opposite steerable rear wheels 7. At its front the chassis 5 has a detachable connection (not shown) with a mower 8 that rides in front of the front wheels 6. The mower 8 is supported at its rear by its connection with the chassis 5 and at its front by a pair of castering roller wheels 9.

Figure 2:
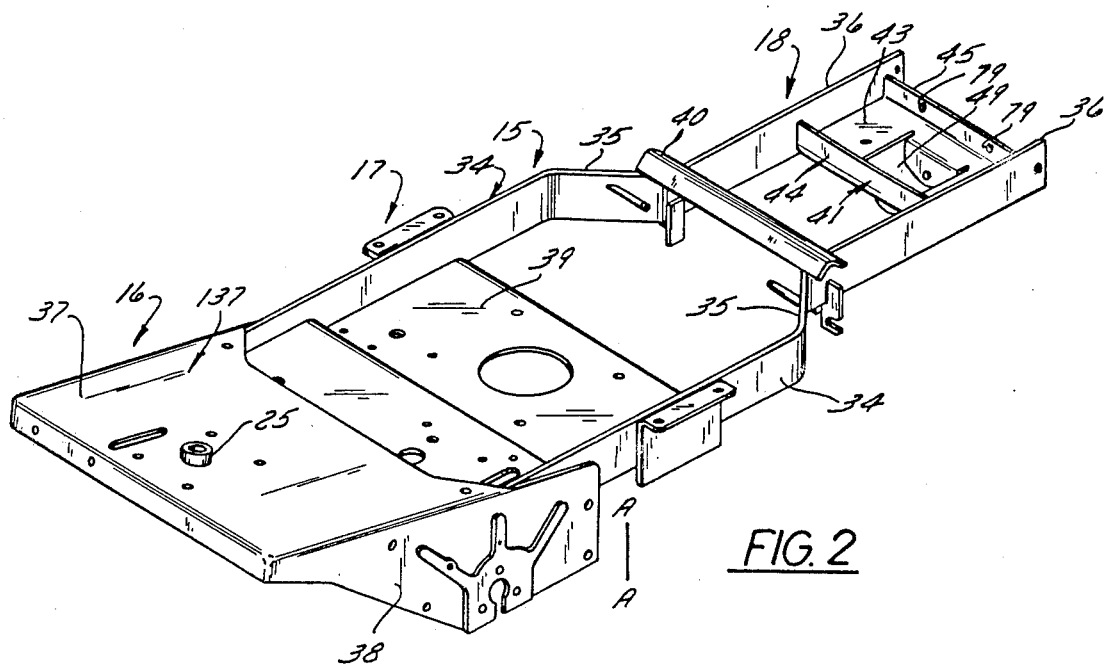
FIG. 2 is a perspective view of the chassis frame.
Figure 3:
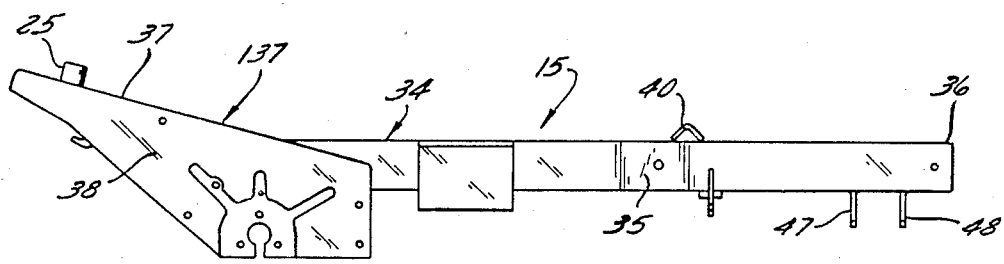
FIG. 3 is a view of the frame in side elevation.
Figure 4:
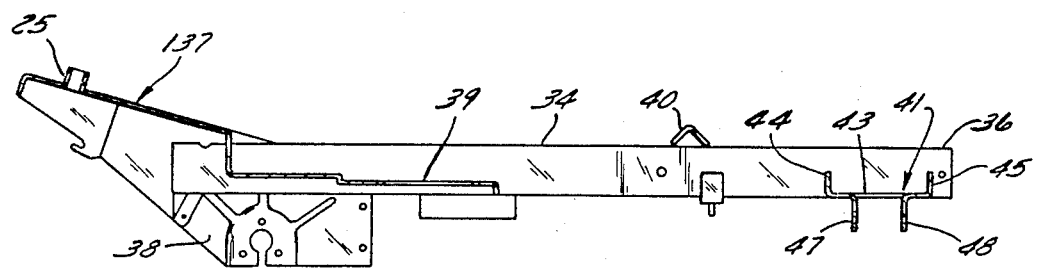
FIG. 4 is a view of the frame in section, taken on its vertical plane of symmetry.
Figure 5:
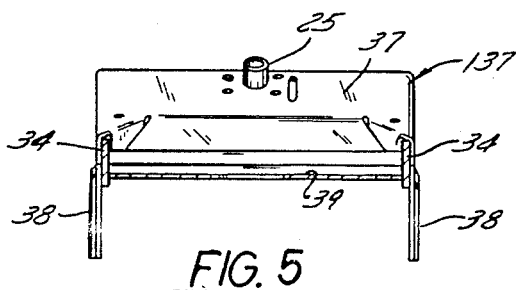
FIGS. 5 and 6 are sectional views of the frame taken on the plane of the line A—A in FIG. 2 and looking forward and rearward, respectively.
Figure 6:
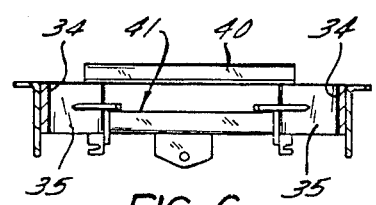

The chassis 5 has a rigid and sturdy frame 15, shown in its entirety in FIG. 2. The frame 15 is elongated in a fore-and-aft direction and can be substantially symmetrical to a vertical plane which extends in that direction and which thus contains the longitudinal centerline of the chassis. The frame 15 comprises, in general, a front portion 16 on which the front wheels 6 are mounted and to which the mower 8 is connectable, a medial portion 17 that supports an engine (not shown) whereby the mower and the front wheels are driven through suitable transmission means (not shown), and a rear portion 18 to which is connected a rear axle 20 on which the rear wheels 7 are mounted. The medial portion 17 of the frame also supports a housing 21 which partially encloses the engine and on top of which an operator's seat 22 is mounted.

Steering of the rear wheels 7 is controlled by means of a steering wheel 23 on the top of an upright steering shaft 24 which is rotatably mounted in a bushing 25 fixed on the front portion 16 of the chassis frame. Surrounding the steering shaft along most of its height is a pedestal-like housing 26 on which levers for control of the engine and the traction transmission are accessible to the operator.

The chassis frame 15 comprises a pair of laterally opposite flat and edgewise upright unflanged steel bars or beams 34, each extending along most of the length of the chassis. Through the front portion 16 of the frame and most of its medial portion 17 these beams 34 are straight and parallel to one another, but at the rear of the medial portion 17 they are bent to have oblique medial segments 35 that extend rearward in convergent relation to one another, so that the rear segments 36 of the two beams, which are straight and parallel to one another, are laterally spaced apart by a substantially smaller distance than the longer front portions of the beams. As seen from either side of the frame the two beams are straight along their lengths, and their top edge surfaces are contained in a common horizontal plane, as are their bottom edge surfaces. It will be observed that the two beams can be identical with one another.

The front and medial portions of the beams 34 are bridged by a heavy sheet metal member 137 that has a front portion 37 which is inclined forwardly and upwardly to serve as a footrest for the operator and to which is fixed the steering shaft bushing 25. At its opposite sides this front portion of the sheet metal member is bent down to have vertical side portions 38 which overlie the laterally outer surfaces of the beams 34 and which provide supports fo the front wheel bearings (not shown). The rearmost portion 39 of this sheet metal member 137, which extends horizontally and is stepped down relative to the remainder of that member to be at a lever just above the bottom surfaces of the beams, is at the medial portion of the frame and serves an an engine mount. The sheet metal member 137 is welded to the beams at least at intervals along them to unify them into a rigid structure.

At the rear ends of the oblique segments 35 of the beams 34 they are bridged by an angle iron 40 that is welded to the beams with its longitudinal edges resting upon their upper surfaces and its apex uppermost. A U-shaped rear bridging member 41 extends between the parallel rear segments 36 of the beams 34, near their rear ends, and provides for a swingable connection of the rear axle 20 with the frame, as explained below. This rear bridging member 41 isalso secured to both beams 34 by weldments, so that it and the angle iron 40 further connect the beams into a unified rigid and sturdy frame structure.

The U-shaped rear bridging member 41 can readily be made in one piece. It has a flat and horizontal web portion 43 which is of substantial width as measured in the fore-and-aft direction along the frame 15 and which is long enough to extend from one to the other of the opposing upright surfaces of the beams 34 and have its end edges welded to them at a level a little above their bottom edges. The rear bridging member 41 further comprises front and rear elongated flanges 44, 45, each projecting edgewise upward from one of the longitudinal edges of the web portion 43 and extending along the full length thereof to have its opposite ends likewise welded to the opposing upright surfaces of the beams 34. Each of these flanges 44, 45 is of such height that its top edge is spaced a little below the level of the top edges of the beams. The flanges 44, 45 and the beams 34 thus project above the web portion 43 in surrounding relation to it and cooperate with it to define a rectangular pan in which removable weights 46 can be supported and confined as described below.

Struck out of the web portion 43 of the rear bridging member 41 and bent downward from it are front and rear lugs 47, 48 that provide for the pivotal connection between the rear axle 20 and the frame 15. The two lugs 47, 48 are flat and parallel to one another, each being edgewise vertical as well as extending edgewise laterally. As measured transversely to the vertical plane of symmetry, to which they are likewise symmetrical, the lugs 47, 48 are substantially shorter than the web portion 43. The front lug 47 is spaced a distance to the rear of the front flange 44, and the rear lug 48 is spaced a like distance to the front of the rear flange 45. Thus there are substantial areas of the web portion 43 all around the hole 49 in it that is produced when the lugs 47, 48 are struck out of it. It will be observed that the rear bridging member 41, as seen in plan view, is symmetrical to both its longitudinal and lateral centerlines, to facilitate its assembly with the side beams 34.

The rear axle 20 is attached to the frame by means of a trunnion bolt 51 that extends through coaxial holes 52 in the lugs 47, 48 each said hole being centered in its lug a little above the bottom edge thereof. The connection comprising the trunnion bolt 51 permits the rear axle 20 to be freely swingable relative to the frame about a pivot axis which is midway between the ends of the axle and which is contained in the above mentioned vertical plane of symmetry and extends in the fore-and-aft direction. All four of the wheels 6, 7 can thus maintain engagement with the ground as the chassis traverses irregular terrain, assuring good propulsion and steering traction.

The rear axle 20 can comprise an unflanged edgewise upright flat beam having an upright tubular socket 27 fixed to each of its ends. Secured to the top of the axle 20 midway between its ends is a fore-and-aft extending tube 53 in which there is a rotatable bushing 54 wherein the trunnion bolt 51 is received with a close fit. For stability, the distance between the lugs 47, 48 is substantially greater than the fore-and-aft thickness of the axle 20, and the tube 53, which is of a length to fit closely between the lugs, is rigidly secured to the axle by means of a bracket structure 55. For lubricating the swiveling joint between the tube 53 and its bushing 54 there is a grease fitting 56 in the top of that tube, midway between its ends, and it will be noted that this grease fitting is readily accessible through the hole 49 in the rear bridging member 41.

Each of the rear wheels 7 is connected with the axle 20 by means of an L-shaped member 28 that comprises a horizontal spindle leg 29 on which the wheel is rotatable and an upright trunnion leg 30 that is pivotably received in one of the tubular sockets 27 on the axle, to provide for steering swivel movements of the wheel. Such swiveling is controlled by means of a steering linkage 32 on the rear axle that is connected with the L-shaped members 28 and is also connected with the steering wheel shaft 24.

Figure 10:
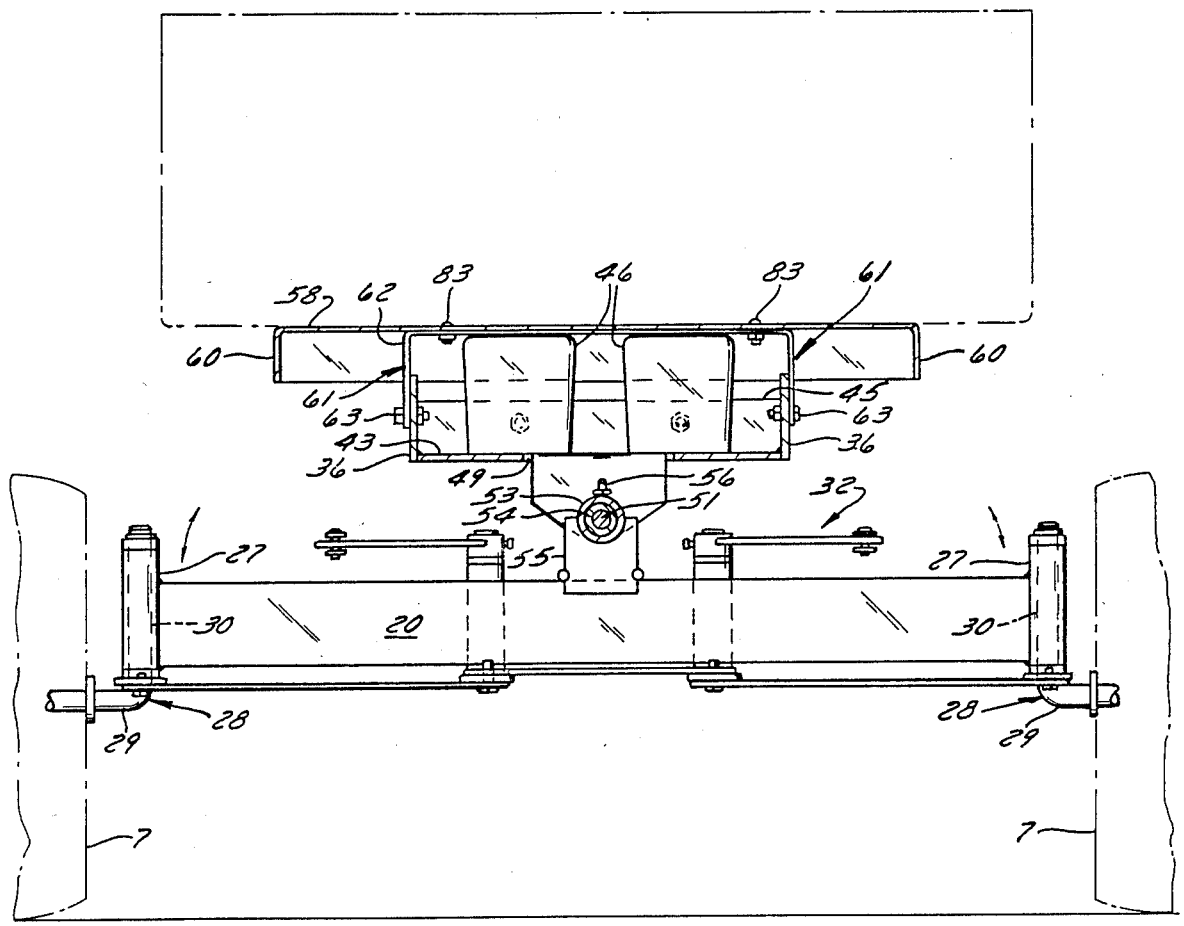
FIG. 10 is a view in section taken on the plane of the line 10—10 in FIG. 8.

Overlying the rear portion 18 of the frame is a flat, rectangular load supporting platform 58 which (as best seen in FIG. 10) is somewhat wider than the distance between the rear portions of the side beams 34 and is of a length (FIG. 8) to have its rear end project a little behind the rear ends of those beams while its front end portion overlies the angle iron bridging member 40. This platform 58 is of inverted pan shape, having downwardly projecting flanges 60 along its four edges that stiffen it. Secured to its underside, a small distance in front of its rear end, is an inverted U-shaped hinge bracket 61 having downwardly projecting laterally opposite legs 62 that overlie the outer upright surfaces of the side beams 34 of the frame. The platform 58 is pivotally connected to the frame by means of a pair of coaxial trunnion bolts 63, each extending through a leg 62 of the hinge bracket 61 and through its underlying frame beam 34 at a location between the rear bridging member 41 and the rear end of the beam. Since the laterally extending horizontal axis defined by the trunnion bolts 63 is near the rear end of the platform 58, gravity tends to swing the platform about that axis towards a normal horizontal position (FIG. 8) in which the apex of the angle iron bridging member 40 supportingly engages it.

Figure 7:
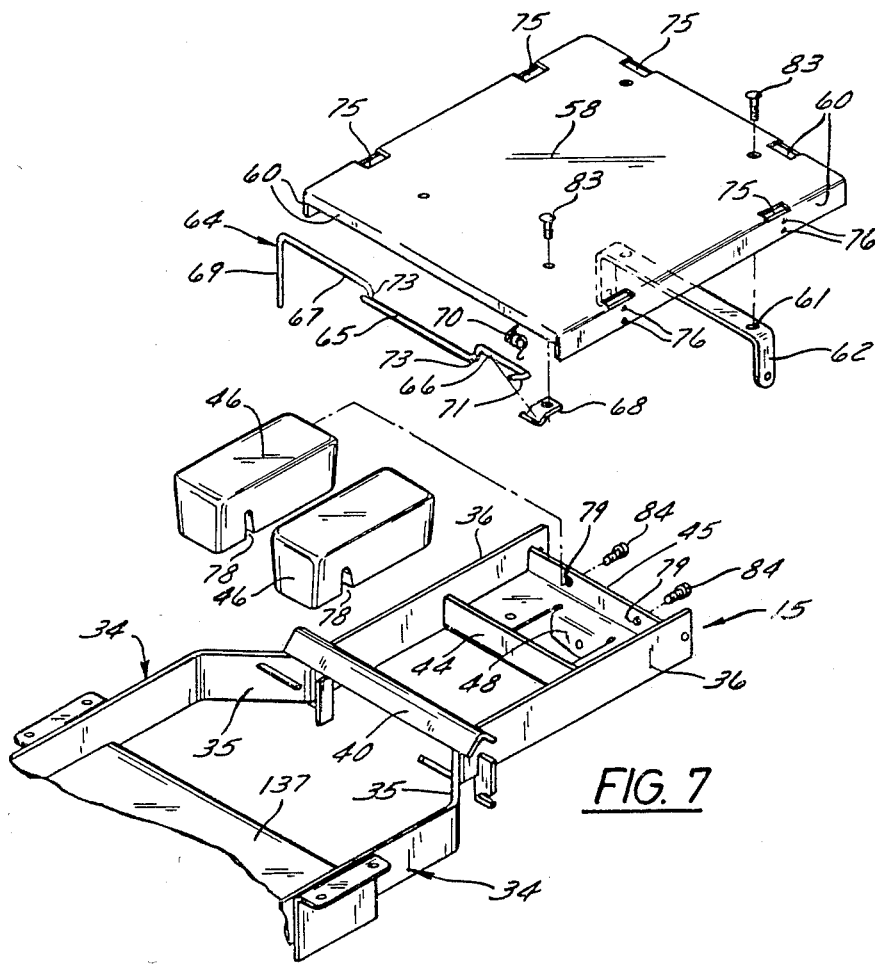
FIG. 7 is a disassembled perspective view of the rear portion of the frame, a pair of weights, and the load supporting platform and its latch.
Figure 11:
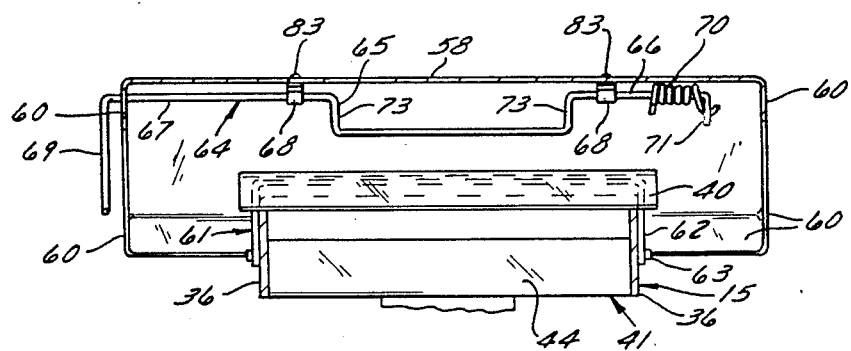
FIG. 11 is a detail sectional view taken on substantially the same plane as FIG. 10 but looking forward.

To releasably secure the platform in this horizontal position, it has at its underside, a latch 64 that cooperates with the angle iron bridging member 40. The latch 64 comprises a single length of stiff wire or rod stock, bent to have a U-shaped medial portion 65 between straight, coaxial pivot portions 66, 67 that extend laterally under the platform. The pivot portions 66, 67 are closely rotatably confined against the underside of the platform by clips 68 which are bolted to the platform. The U-shaped medial portion 65, which constitutes the operative latch portion of the latch, has legs 73 (FIGS. 7, 9 and 11) that project downward and curve forward from the pivot portions 66, 67 for hooking engagement under the angle iron 40.

One of the pivot portions 67 projects through its adjacent side flange 60 on the platform and is bent at a right angle to provide a handle 69 that normally projects downward but can be swung rearward for releasing the latch. The other pivot portion 68 is surrounded by the body of a coiled torsion spring 70 and terminates at a right angle bend that defines a short forwardly projecting biasing arm 71. One end portion of the torsion spring 70 is engaged around the biasing arm 71 and its opposite end reacts against the underside of the platform to urge the latch member for swinging to a position in which its forwardly projecting biasing arm 71 is also engaged against the underside of the platform. In this position of the latch member, its U-shaped latch portion 65 is spaced below and to the front of its coaxial pivot portions 66, 67.

Figure 8:
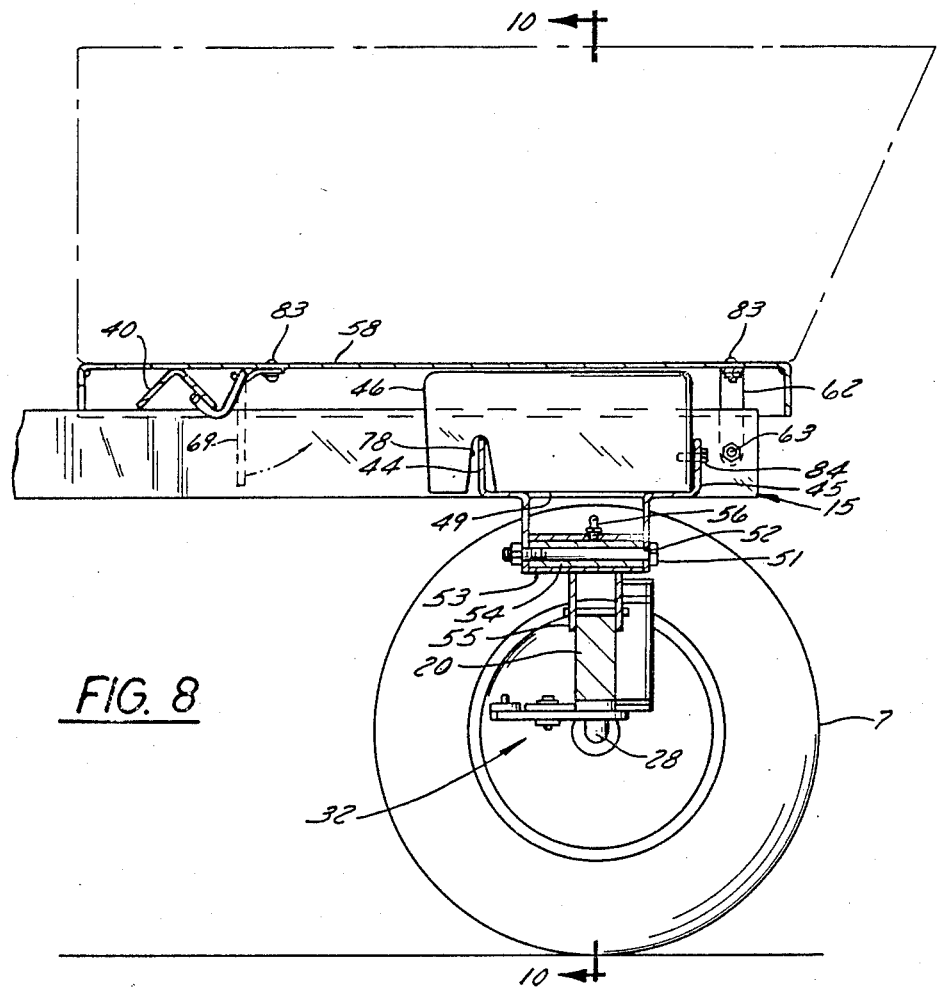
FIG. 8 is a detail sectional view of the rear portion of the complete chassis, taken on substantially the same plane as FIG. 4, but on a larger scale than that figure.
Figure 9:
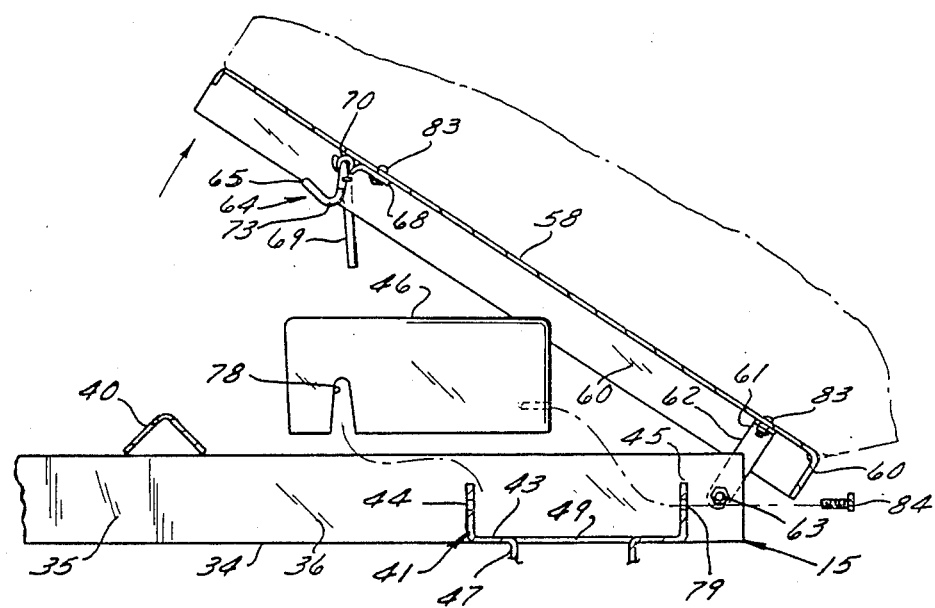
FIG. 9 is a view generally similar to FIG. 8 but showing the load supporting platform in its raised attitude and a weight in removed relation to the frame.

As the platform is lowered from its partially raised position shown in FIG. 9, the latch portion 65 engages the downwardly inclined rear surface of the angle iron 40 and is cammed rearwardly by it, against the bias of the torsion spring 70. As the platform comes to rest on the apex of the angle iron, the latch portion 65 passes under the rear edge of the angle iron as shown in FIG. 8. Thus latching of the platform occurs automatically as it is lowered to its horizontal load supporting position. The forward-upward bias that the torsion spring 70 applies to the latch portion 65 of the latch member tends to maintain the latch member firmly engaged with the angle iron 40 and at the same time draws the platform down into firm engagement with the angle iron, preventing rattling of the platform and the latch. The latch is, of course, released by swinging the handle lever 69 rearward to disengage the medial portion 65 from the angle iron 40.

At its edges the platform has rectangular holes 75 in which posts or stakes (not shown) of a stake body can be received, and the flanges 60 of the platform have screw holes 76 beneath these stake pocket holes 75 to receive screws (not shown) which can be engaged in the lower portions of such stakes to secure them to the platform. The holes 75, 76 also provide for securement to the platform of other accessories (not shown) such as a clipping receptacle, a dump body or a sprayer tank. Bolts 83 whereby the hinge bracket 61 and the latch pivot clips 68 are secured to the underside of the platform can also be employed to secure accessories to the platform, holding such accessories by themselves or in cooperation with the stake pocket holes 75, 76.

When the machine is operated with no load on the platform 58, and especially for operation on a substantial slope, the rear of the chassis is preferably weighted so that the rear wheels will be maintained in firm engagement with the ground for good steering traction. The chassis of this invention nicely accommodates a pair of block-like weights 46 which can be supported in the pan-like compartment defined by the U-shaped rear bridging member 41, resting on its horizontal web portion 43 to be directly over the rear wheels and beneath the load supporting platform 58. For ample mass, each of these weights can have a length somewhat greater than the distance between the flanges 44, 45 of the bridging member 41 and can have a transversely extending downwardly opening groove 78 in its underside in which the front one 44 of those flanges is received when the rear surface of the weight is engaged against the rear flange 45. The rear flange 45 has a pair of holes 79 therethrough, one for each weight 46, and a bolt 84 threaded into each weight through one of these holes confines the weight against lateral shifting and upward displacement relative to the frame, while the flanges 44, 45 confine it against fore-and-aft displacement.

From the foregoing description and the accompanying drawings, it will be apparent that this invention provides a sturdy, compact and inexpensive riding lawn mower chassis for a front mounted mower, having front traction wheels, steerable rear wheels, an engine mounted between the front and rear wheels, and an operator's seat supported over the engine. It will also be apparent that the frame of the riding mower chassis of this invention, although comprised of relatively few and simple parts, provides for tiltable mounting of the rear axle whereby all wheels are maintained in good contact with the ground, accommodates a self-latching tiltable load supporting platform that can carry a clipping receptacle or other accessories, and has provision for simple securement thereto of removable weights in positions directly over the rear wheels and under the load supporting platform.

What is claimed as the invention is:
1. In a self-propelled riding vehicle:
an elongated, longitudinally extending frame comprising a pair of laterally spaced apart beam elements having a top surface, a bridging member extending laterally between said beam elements, and a laterally extending angle iron secured to and bridging across said beam elements with its apex uppermost, a pair of front, ground engaging traction wheels mounted adjacent a front end of said frame for propelling said vehicle; a pair of steerable wheels mounted adjacent a rear end of said frame; a mid-mounted power source on said frame for driving said traction wheels;
an accessory platform having a front edge and a rear edge, said platform mounted on and adjacent the rear end of said frame; means for pivotally connecting said frame and said platform to enable said platform to pivot about a transverse, horizontal hinge axis located adjacent its rear edge, whereby said platform can swing between a generally horizontal accessory carrying position and a downwardly and rearwardly tilting position in which said front edge of said platform is raised; and operator controlled latch means between said frame and said platform for locking said platform in said horizontal position, said latch means comprising:

(1) said laterally extending angle iron which is secured to and bridging across said beam elements with its longitudinal edges resting upon their top surfaces and its apex uppermost so as to provide an upper surface that is inclined rearward and downward from its apex, said angle iron being spaced forward from said hinge axis for supporting engagement by a front portion of said platform in its said horizontal position;

(2) a latching member carried by said platform and having a latch portion spaced beneath said platform and confined to movement relative to said platform substantially in said fore-and-aft direction between a forward latching position in which said latch portion can engage under said angle iron and a rearward releasing position in which said latch portion is clear of said angle iron;

(3) biasing means reacting between said platform and said latching member to urge said latch portion towards its latching position, said biasing means being yieldable to permit said latch portion to be cammed to its releasing position by said surface on said angle iron as said platform swings towards its load carrying position; and (4) a manual actuator accessible adjacent to one edge of said platform and connected with said latching member for manually shifting said latch portion to its releasing position.

2. The vehicle set forth in claim 1, further characterized by means for selectively and removably attaching any one of a number of accessories to said platform.

3. The vehicle set forth in claim 1, further characterized in that said platform is biased by its own weight towards said horizontal position.

4. The vehicle as described in claim 1, further characterized in that said bridging member of said frame and said platform cooperate to define a compartment therebetween for the removable storage of a weight directly over said rear wheels, said weight being accessible when said platform is tilted rearwardly.

5. A riding mower chassis to which a mower is attachable, comprising a frame elongated in a fore-and-aft direction and having a front portion to which laterally opposite propulsion wheels are connected, a rear portion to which laterally opposite steerable wheels are connected, and a medial portion on which an engine is mounted and on which a seat is supported over said engine, said riding mower chassis being characterized by:

A. said rear portion of said frame comprising
  (1) a pair of laterally spaced apart beam elements extending rearward from said medial portion of said frame and having top surfaces contained in a common horizontal plane,
  (2) a bridging member extending laterally between said beam elements and secured to them near their rear ends, said bridging member having
    (1) a substantially flat and horizontal web portion which is spaced below said plane and
    (2) a pair of flange portions, each of which is elongated transversely to said beam elements and extends from one to the other of them, said flange portions being spaced apart in said fore-and-aft direction and projecting upward from said web portion to cooperate with it and with said beam elements in defining a pan, and
    (3) a pair of lugs on said bridging member, projecting downward therefrom to a level beneath said web portion, said lugs being disposed between said beam elements and being spaced apart in said fore-and-aft direction;
B. an elongated axle member having a pair of opposite end portions to each of which one of said steerable wheels has a connection that provides for it to be rotatable and swivelable for steering; and
C. pivot means providing a connection between said pair of lugs and said axle member whereby the latter is confined to swinging relative to said frame about an axis which is intermediate said end portions of said axle member, extends substantially in said fore-and-aft direction and is substantially equidistant from said beam elements.

6. The riding mower chassis of claim 5 wherein said bridging member is of substantially U-shaped cross-section and has its flange portions formed in one piece with its web portion and bent upward therefrom, further characterized in that said lugs are formed in one piece with said bridging member, being struck out of said web portion thereof and bent downward therefrom.

7. The riding mower chassis of claim 5 wherein said web portion of said bridging member is adapted to support at least one removable weight that is confined by said flange portions against movement in said fore-and-aft directions, further characterized in that:

at least one of said flange portions of said bridging member has at least one hole therein through which a fastener can extend to be received in said weight for securing the same against displacement inwardly and in transverse directions relative to said frame.

8. The riding mower chassis of claim 5, further characterized by:
  (1) a substantially flat platform having a length between front and rear edges thereof and a width between opposite side edges thereof to overlie said beam elements when it is in a horizontal load carrying position; and
  (2) cooperating hinge means on said platform and on said beam elements defining a hinge axis which is transverse to said beam elements and near their rear ends and the rear edge of said platform, said hinge means confining said platform to swinging about said hinge axis relative to said frame between said horizontal position and a dumping position wherein said front edge is raised.

9. The riding mower chassis of claim 8, further characterized by:
  (3) cooperating latch means on said platform, near said front edge thereof, and on said frame, near said medial portion thereof, for releasably confining said platform against swinging out of its load carrying position.

10. The riding mower chassis of claim 8, further characterized by:

(1) a laterally extending angle iron secured to and bridging across said beam elements with its longitudinal edges resting upon their top surfaces and its apex uppermost to have an upper surface that is inclined rearward and downward from its apex, said angle iron being spaced forward from said hinge axis for supporting engagement by a front portion of said platform in its said horizontal position;

(2) a latching member carried by said platform and having a latch portion spaced beneath said platform and confined to movement relative to said platform substantially in said fore-and-aft direction between a forward latching position in which said latch portion can engage under said angle iron and a rearward releasing position in which said latch portion is clear of said angle iron;

(3) biasing means reacting between said platform and said latching member to urge said latch portion towards its latching position, said biasing means being yieldable to permit said latch portion to be cammed to its releasing position by said surface on said angle iron as said platform swings towards its load carrying position; and (4) a manual actuator accessible adjacent to one edge of said platform and connected with said latching member for manually shifting said latch portion to its releasing position.

11. The riding mower chassis of claim 10 wherein said latching member comprises a single piece of wire bent to have straight, coaxial pivot portions that extend laterally and are confined to rotation at the underside of said platform and to have, between said pivot portions, a U-shaped medial portion with downwardly projecting and forwardly curving legs that comprises said latch portion.

12. A riding mower chassis to which a mower is attachable, comprising a frame elongated in a fore-and-aft direction and supported on front and rear ground engaging wheels, said frame having a medial portion on which an operator's seat is supported and a rear portion behing said operator's seat, said riding mower chassis being characterized by:

A. said rear portion of said frame comprising
  (1) a pair of laterally spaced beam elements extending substantially in said direction between said medial portion of said frame and a rear end thereof and having top surfaces contained in a common horizontal plane, and
  (2) a laterally extending angle iron secured to and bridging across said beam elements in forwardly spaced relation to said rear end of said frame, said angle iron having its longitudinal edges resting upon said top surfaces of said beam elements and its apex uppermost to have an upper surface that is inclined rearward and downward from its apex;

B. a substantially flat platform having opposite front and rear edges and opposite side edges;

C. pivot means connecting said platform with said frame, defining a laterally extending pivot axis adjacent to said rear end of said frame and to said rear edge of said platform, and confining said platform to swinging about said pivot axis relative to said frame down to and up from a horizontal position in which a front portion of said platform rests for support upon said angle iron;

D. means for releasably and automatically locking said platform in its horizontal position as it is swung down to the same, the last mentioned means comprising
  (1) a latching member carried by said platform at its underside and having a latch portion that is spaced beneath said platform and is confined to motion relative to it forwardly toward and rearwardly away from a latching position which said latch portion occupies when said platform is in its horizontal position and in which said latch portion is engaged under said angle iron,
  (2) biasing means reacting between said platform and said latching member to urge said latch portion towards its latching position, said biasing means being yieldable to permit said latch portion to be cammed away from its latching position by said surface on said angle iron as said platform swings down to its said horizontal position, and
  (3) a manual actuator accessible adjacent to one of said edges of said platform and connected with said latching member for manually shifting said latch portion away from its latching position.

13. A riding mower chassis comprising a frame elongated in a fore-and-aft direction and having a portion to which laterally opposite wheels are connected, said riding mower chassis being characterized by:

A. said frame comprising
  (1) a pair of laterally spaced apart beam elements, having top surfaces,
  (2) a bridging member extending laterally between said beam elements and secured to them, said bridging member being elongated transversely to and connected between said beam elements and cooperating with said beam elements in defining a pan, and
  (3) a pair of lugs internally formed on said bridging member, projecting downward therefrom and being spaced apart in said fore-and-aft direction;

B. an elongated axle member for said wheels; and

C. pivot means providing a connection between said pair of lugs and said axle member whereby the latter is confined to swinging relative to the frame about an axis which is intermediate the end portions of the axle member, and extends substantially in said fore-and-aft direction.

14. The riding mower chassis of claim 13 wherein said bridging member is of substantially U-shaped cross-section, further characterized in that
said lugs are integrally formed with said bridging member, being struck out thereof and bent downward therefrom.

15. The riding mower chassis of claim 13 wherein said bridging member is adapted to support at least one removable weight that is confined thereby against movement in said fore-and-aft directions, further characterized in that:
said bridging member has at least one hole therein through which a fastener can extend to be received in said weight for securing the same against displacement upwardly and in transverse directions relative to said frame.

16. The rider mower chassis of claim 13, further characterized by:
(1) a platform having a length between front and rear edges thereof and a width between opposite side edges thereof to overlie said beam elements when it is in a horizontal load carrying position; and
(2) cooperating hinge means on said platform and on said beam elements defining a hinge axis which is transverse to said beam elements and near the rear edge of said platform, said hinge means confining said platform to swinging about said hinge axis relative to said frame between said horizontal position and a dumping position wherein said front edge is raised.

17. The riding mower chassis of claim 16, further characterized by:
(3) cooperating latch means on said platform, near said front edge thereof, and on said frame, for releasably confining said platform against swinging out of its load carrying position.

18. The riding mower chassis of claim 16, further characterized by:
(1) a laterally extending angle iron secured to and bridging across said beam elements with its longitudinal edges resting upon their top surfaces and its apex uppermost to have an upper surface that is inclined rearward and downward from its apex, said angle iron being spaced forward from said hinge axis for supporting engagement by a front portion of said platform in its said horizontal position;
(2) a latching member carried by said platform and having a latch portion spaced beneath said platform and confined to movement relative to said platform substantially in said fore-and-aft direction between a forward latching position in which said latch portion can engage under said angle iron and a rearward releasing position in which said latch portion is clear of said angle iron;
(3) biasing means reacting between said platform and said latching member to urge said latch portion towards its latching position, said biasing means being yieldable to permit said latch portion to be cammed to its releasing position by said surface on said angle iron as said platform swings towards its load carrying position; and
(4) a manual actuator accessible adjacent to one edge of said platform and connected with said latching member for manually shifting said latch portion to its releasing position.

19. The riding mower chassis of claim 18 wherein said latching member comprises a member having straight, coaxial pivot portions that extend laterally and are confined to rotation at the underside of said platform and having, between said pivot portions, a U-shaped medial portion with downwardly projecting and forwardly curving legs that comprises said latch portion.

20. A riding mower chassis comprising a frame elongated in a fore-and-aft direction and supported on front and rear ground engaging wheels, said frame having a medial portion on which an operator's seat is supported and a rear portion behind the operator's seat, said riding mower chassis being characterized by:
A. said rear portion of said frame comprising
(1) a pair of laterally spaced beam elements extending substantially in said direction between said medial portion of said frame and a rear end thereof and having top surfaces, and
(2) a laterally extending angle iron secured to and bridging across said beam elements in forwardly spaced relation to said rear end of said frame, said angle iron having its longitudinal edges resting upon said top surfaces of said beam elements and its apex uppermost to have an upper surface that is inclined rearward and downward from its apex;
B. a platform having opposite front and rear edges and opposite side edges;
C. pivot means connecting said platform with said frame, defining a laterally extending pivot axis adjacent to said rear end of said frame and to said rear edge of said platform, and confining said platform to swinging about said pivot axis relative to said frame down to and up from a horizontal position in which a front portion of said platform rests for support upon said angle iron;
D. means for releasably and automatically locking said platform in its horizontal position as it is swung down to the same, the last mentioned means comprising
(1) a latching member carried by said platform at its underside and having a latch portion that is spaced beneath said platform and is confined to motion relative to it forwardly toward and rearwardly away from a latching position where said latch portion occupies when said platform is in its horizontal position and in which said latch portion is engaged under said angle iron,
(2) biasing means reacting between said platform and said latching member to urge said latch portion towards its latching position, said biasing means being yieldable to permit said latch portion to be cammed away from its latching position by said surface on said angle iron as said platform swings down to its said horizontal position, and
(3) a manual actuator accessible adjacent to one of said edges of said platform and connected with said latching member for manually shifting said latch portion away from its latching position.

* * * * *